United States Patent
Gottlieb (10) Patent No.: US 9,734,410 B2
(45) Date of Patent: Aug. 15, 2017

(54) SYSTEMS AND METHODS FOR ANALYZING FACIAL EXPRESSIONS WITHIN AN ONLINE CLASSROOM TO GAUGE PARTICIPANT ATTENTIVENESS

(71) Applicant: Shindig, Inc., New York, NY (US)

(72) Inventor: Steven M. Gottlieb, New York, NY (US)

(73) Assignee: SHINDIG, INC., New York, NY (US)

(*) Notice: Subject to any disclaimer, the term of this patent is extended or adjusted under 35 U.S.C. 154(b) by 31 days.

(21) Appl. No.: 15/005,885

(22) Filed: Jan. 25, 2016

(65) Prior Publication Data
US 2016/0217321 A1    Jul. 28, 2016

Related U.S. Application Data

(60) Provisional application No. 62/106,842, filed on Jan. 23, 2015.

(51) Int. Cl.
G06K 9/68 (2006.01)
G06K 9/00 (2006.01)

(52) U.S. Cl.
CPC ..... G06K 9/00771 (2013.01); G06K 9/00308 (2013.01)

(58) Field of Classification Search
CPC ......... G06K 9/00241; G06K 9/00288; G06K 9/00302; G06K 9/00308; G06K 9/00771; G06K 9/6201
See application file for complete search history.

(56) References Cited

U.S. PATENT DOCUMENTS

| | | |
|---|---|---|
| 6,044,146 A | 3/2000 | Gisby et al. |
| 6,241,612 B1 | 6/2001 | Heredia |
| 6,259,471 B1 | 7/2001 | Peters et al. |
| 6,559,863 B1 | 5/2003 | Megiddo |

(Continued)

FOREIGN PATENT DOCUMENTS

| | | |
|---|---|---|
| CA | 2771785 A | 3/2011 |
| CA | 2774014 A | 4/2011 |

(Continued)

OTHER PUBLICATIONS

About TokBox, Inc., All about TokBox, http://www.tokbox.com/about, retrieved Feb. 4, 2011, p. 1.

(Continued)

Primary Examiner — Phuoc Tran
(74) Attorney, Agent, or Firm — Robert W. Morris; Eckert Seamans Cherin & Mellott, LLC (57) ABSTRACT

Systems, methods, and non-transitory computer readable analyzing facial expressions within an interactive online event to gauge participant level of attentiveness are provided. Facial expressions from a plurality of participants accessing an interactive online event may be analyzed to determine each participant's facial expression. The determined expressions may be analyzed to determine an overall level of attentiveness. The level of attentiveness be relayed to the host of the interactive online event to inform him or her how the participants are reacting to the interactive online event. If there are participants not paying attention or confused, the host may modify their presentation to increase the attentiveness of the students.

20 Claims, 8 Drawing Sheets
(4 of 8 Drawing Sheet(s) Filed in Color)

(56) References Cited

U.S. PATENT DOCUMENTS

| | | |
|---|---|---|
| 6,654,346 B1 | 11/2003 | Mahalingaiah et al. |
| 6,697,614 B2 | 2/2004 | Dorenbosch |
| 7,478,129 B1 | 1/2009 | Chemtob |
| 7,487,211 B2 | 2/2009 | Beavers et al. |
| 7,495,687 B2 | 2/2009 | DuMas et al. |
| 7,515,560 B2 | 4/2009 | DuMas et al. |
| 7,593,032 B2 | 9/2009 | Civanlar et al. |
| 7,958,457 B1 | 6/2011 | Brandenberg et al. |
| 8,060,560 B2 | 11/2011 | Vonog et al. |
| 8,144,187 B2 | 3/2012 | Moore et al. |
| 8,171,154 B2 | 5/2012 | Vonog et al. |
| 8,225,127 B2 | 7/2012 | Vonog et al. |
| 8,390,670 B1 | 3/2013 | Gottlieb |
| 8,405,702 B1 | 3/2013 | Gottlieb |
| 8,429,704 B2 | 4/2013 | Vonog et al. |
| 8,458,328 B2 | 6/2013 | Dubovik et al. |
| 8,463,677 B2 | 6/2013 | Vonog et al. |
| 8,527,654 B2 | 9/2013 | Vonog et al. |
| 8,549,167 B2 | 10/2013 | Vonog et al. |
| 8,647,206 B1 | 2/2014 | Gottlieb |
| 8,779,265 B1 | 7/2014 | Gottlieb |
| 8,902,272 B1 | 12/2014 | Gottlieb |
| 8,929,516 B2 | 1/2015 | Odinak |
| 9,124,760 B2 | 9/2015 | Gottlieb |
| 9,215,412 B2 | 12/2015 | Gottlieb |
| 2002/0094831 A1 | 7/2002 | Maggenti et al. |
| 2002/0165921 A1 | 11/2002 | Sapieyevski |
| 2002/0169014 A1 | 11/2002 | Egozy et al. |
| 2003/0000369 A1 | 1/2003 | Funaki |
| 2003/0014262 A1 | 1/2003 | Kim |
| 2003/0164084 A1 | 9/2003 | Redmann et al. |
| 2004/0022202 A1 | 2/2004 | Yang et al. |
| 2005/0032539 A1 | 2/2005 | Noel et al. |
| 2005/0078613 A1 | 4/2005 | Covell et al. |
| 2005/0132288 A1 | 6/2005 | Kirn et al. |
| 2005/0143135 A1 | 6/2005 | Brems et al. |
| 2005/0262542 A1 | 11/2005 | DeWeese et al. |
| 2006/0055771 A1 | 3/2006 | Kies |
| 2006/0063555 A1 | 3/2006 | Robbins |
| 2006/0112814 A1 | 6/2006 | Paepcke |
| 2006/0114314 A1 | 6/2006 | Dunko |
| 2006/0140138 A1 | 6/2006 | Hill |
| 2007/0039449 A1 | 2/2007 | Redmann |
| 2007/0140510 A1 | 6/2007 | Redmann |
| 2007/0255816 A1 | 11/2007 | Quackenbush et al. |
| 2007/0265074 A1 | 11/2007 | Akahori et al. |
| 2008/0002668 A1 | 1/2008 | Asokan et al. |
| 2008/0037763 A1 | 2/2008 | Shaffer et al. |
| 2008/0136898 A1 | 6/2008 | Eisenberg et al. |
| 2008/0137559 A1 | 6/2008 | Sasaki et al. |
| 2008/0181260 A1 | 7/2008 | Vonog et al. |
| 2008/0190271 A1 | 8/2008 | Taub et al. |
| 2008/0232248 A1 | 9/2008 | Barave et al. |
| 2008/0274810 A1 | 11/2008 | Hayashi et al. |
| 2009/0033737 A1 | 2/2009 | Goose et al. |
| 2009/0040289 A1 | 2/2009 | Hetherington et al. |
| 2009/0054107 A1 | 2/2009 | Feland, III et al. |
| 2009/0070420 A1 | 3/2009 | Quackenbush |
| 2009/0172200 A1 | 7/2009 | Morrison et al. |
| 2009/0186605 A1 | 7/2009 | Apfel et al. |
| 2009/0209339 A1 | 8/2009 | Okada |
| 2009/0249244 A1 | 10/2009 | Robinson et al. |
| 2010/0122184 A1 | 5/2010 | Vonog et al. |
| 2010/0165904 A1 | 7/2010 | Woodward et al. |
| 2010/0198992 A1 | 8/2010 | Morrison et al. |
| 2010/0316232 A1 | 12/2010 | Acero et al. |
| 2011/0011244 A1 | 1/2011 | Homburg |
| 2011/0011246 A1 | 1/2011 | Buskies et al. |
| 2011/0055317 A1 | 3/2011 | Vonog et al. |
| 2011/0078532 A1 | 3/2011 | Vonog et al. |
| 2011/0179180 A1 | 7/2011 | Schleifer et al. |
| 2011/0258474 A1 | 10/2011 | Vonog et al. |
| 2012/0038550 A1 | 2/2012 | Lemmey et al. |
| 2012/0039382 A1 | 2/2012 | Vonog et al. |
| 2012/0041859 A1 | 2/2012 | Vonog et al. |
| 2012/0060101 A1 | 3/2012 | Vonog et al. |
| 2012/0084456 A1 | 4/2012 | Vonog et al. |
| 2012/0084672 A1 | 4/2012 | Vonog et al. |
| 2012/0110162 A1 | 5/2012 | Dubovik et al. |
| 2012/0110163 A1 | 5/2012 | Dubovik et al. |
| 2012/0124128 A1 | 5/2012 | Vonog et al. |
| 2012/0127183 A1 | 5/2012 | Vonog et al. |
| 2012/0151541 A1 | 6/2012 | Vonog et al. |
| 2012/0192087 A1 | 7/2012 | Lemmey |
| 2012/0198334 A1 | 8/2012 | Surin et al. |
| 2012/0246227 A1 | 9/2012 | Vonog et al. |
| 2012/0249719 A1 | 10/2012 | Lemmey et al. |
| 2012/0254649 A1 | 10/2012 | Vonog et al. |
| 2012/0272162 A1 | 10/2012 | Surin et al. |
| 2012/0280905 A1 | 11/2012 | Vonog et al. |
| 2012/0293600 A1 | 11/2012 | Lemmey et al. |
| 2012/0297320 A1 | 11/2012 | Lemmey et al. |
| 2012/0326866 A1 | 12/2012 | Lemmey et al. |
| 2012/0331089 A1 | 12/2012 | Vonog et al. |
| 2012/0331387 A1 | 12/2012 | Lemmey et al. |
| 2013/0014027 A1 | 1/2013 | Lemmey |
| 2013/0014028 A1 | 1/2013 | Lemmey et al. |
| 2013/0019184 A1 | 1/2013 | Vonog et al. |
| 2013/0021431 A1 | 1/2013 | Lemmey et al. |
| 2013/0088518 A1 | 4/2013 | Lemmey et al. |
| 2013/0102854 A1 | 4/2013 | Zheng et al. |
| 2013/0109302 A1 | 5/2013 | Levien et al. |
| 2013/0115582 A1 | 5/2013 | el Kaliouby et al. |
| 2013/0121503 A1 | 5/2013 | Ankolekar et al. |
| 2013/0151333 A1 | 6/2013 | el Kaliouby et al. |
| 2013/0156093 A1 | 6/2013 | Vonog et al. |
| 2013/0191479 A1 | 7/2013 | Gottlieb |
| 2014/0033900 A1 | 2/2014 | Chapman et al. |
| 2014/0051047 A1 | 2/2014 | Bender et al. |
| 2014/0058828 A1 | 2/2014 | el Kaliouby et al. |
| 2014/0154659 A1 | 6/2014 | Otwell |
| 2014/0201207 A1 | 7/2014 | Sadowsky et al. |
| 2014/0229866 A1 | 8/2014 | Gottlieb |
| 2015/0054911 A1 | 2/2015 | Gottlieb |
| 2015/0106227 A1 | 4/2015 | Gottlieb |
| 2015/0116448 A1 | 4/2015 | Gottlieb |
| 2015/0220774 A1* | 8/2015 | Ebersman ......... G06K 9/00308 382/118 |
| 2015/0301694 A1 | 10/2015 | Gottlieb |
| 2015/0301720 A1 | 10/2015 | Gottlieb |
| 2015/0304376 A1 | 10/2015 | Gottlieb |
| 2015/0304608 A1 | 10/2015 | Gottlieb |
| 2015/0326458 A1 | 11/2015 | Gottlieb |
| 2015/0328545 A1 | 11/2015 | Gottlieb |
| 2015/0334142 A1 | 11/2015 | Gottlieb |
| 2016/0127429 A1* | 5/2016 | Singh ................ H04L 65/403 705/327 |

FOREIGN PATENT DOCUMENTS

| | | |
|---|---|---|
| EP | 0721726 A | 12/2000 |
| EP | 2471221 A | 7/2012 |
| EP | 2484091 A | 8/2012 |
| EP | 2630630 A | 8/2013 |
| EP | 2636194 A | 9/2013 |
| GB | 2446529 A | 8/2008 |
| WO | 2009077936 A | 6/2009 |
| WO | 2011025989 A | 3/2011 |
| WO | 2011041229 A | 4/2011 |
| WO | 2012021173 A | 2/2012 |
| WO | 2012021174 A | 2/2012 |
| WO | 2012021901 A | 2/2012 |
| WO | 2012054089 A | 4/2012 |
| WO | 2012054895 A | 4/2012 |
| WO | 2012060977 A | 5/2012 |
| WO | 2012060978 A | 5/2012 |
| WO | 2012103376 A | 8/2012 |
| WO | 2012135384 A | 10/2012 |
| WO | 2012151471 A | 11/2012 |
| WO | 2012177641 A | 12/2012 |

(56) References Cited

FOREIGN PATENT DOCUMENTS

WO        2012177779 A    12/2012
WO        2013149079 A    10/2013

OTHER PUBLICATIONS

CrunchBase Profile, CrunchBase readeo, http://www.crunchbase.com/company/readeo, retrieved Feb. 3, 2011, pp. 1-2.
CrunchBase Profile, CrunchBase Rounds, http://www.crunchbase.com/company/6rounds, retrieved Feb. 4, 2011, pp. 1-2.
CrunchBase Profile, CrunchBase TokBox, http://www.crunchbase.com/company/tokbox, retrieved Feb. 4, 2011, pp. 1-3.
Online Collaboration GoToMeeting, http://www.gotomeeting.com/fec/online_collaboration, retrieved Feb. 4, 2011, pp. 1-4.
Readeo Press Release, www.mmpublicity.com, Feb. 25, 2010, pp. 1-2.
Rounds.com, Make friends online and enjoy free webcam chats, http://www.rounds.com/about, retrieved Feb. 4, 2011, pp. 1-3.

\* cited by examiner

SYSTEMS AND METHODS FOR ANALYZING FACIAL EXPRESSIONS WITHIN AN ONLINE CLASSROOM TO GAUGE PARTICIPANT ATTENTIVENESS

CROSS-REFERENCE TO RELATED APPLICATION

This application claims the benefit of U.S. Provisional Application No. 62/106,842, filed on Jan. 23, 2015, the disclosure of which is incorporated herein by reference in its entirety.

FIELD OF THE INVENTION

This disclosure generally relates to systems and methods for analyzing facial expressions within an online classroom to gauge participant attentiveness, interest, and/or comprehension.

BACKGROUND OF THE INVENTION

Massive Open Online Courses ("MOOCs") are quickly becoming a major factor in the world of education. The ability to log into a class from one's own personal computer or mobile device enables individuals to participate in the learning process regardless of their location. The expansion of MOOCs has also been aided, in large part, to the advancements in mobile devices, such as laptop computers, tablets, and smartphones, which are rapidly becoming more and more powerful and robust with each passing day.

However, a significant drawback to large MOOCs, or other large interactive online events, is the difficulty a teacher or presenter may encounter trying to effectively transmit the information being presented to the students/participants. In a small classroom, for example, a teacher is capable of seeing each student's face/body to gauge that student's or students' attentiveness. A confused facial expression on multiple students could mean that the subject matter, topic, or delivery technique, may not be working effectively and the teacher may augment or modify their approach accordingly. In a large online classroom, however, the ability to even see each student's face may not be possible (it may not be possible even in a small online "classroom" as well).

Thus, it would be beneficial for there to be systems and methods that allow a teacher or presenter for a massive online event, such as a MOOC, to accurately gauge a level of attentiveness, interest, and/or comprehension of the participants to aid in effectively delivering the intended message.

SUMMARY OF THE INVENTION

Systems and methods for analyzing facial expression within an online classroom to gauge participant attentiveness, interest, and/or comprehension are described herein.

In one embodiment, a method for monitoring participants' level of attentiveness within an online event is provided. In the exemplary embodiment, a plurality of videos from a plurality of participants accessing an interactive online event may be received. In this embodiment, each received video may correspond to a different participant. At least one facial image from each video may be captured. Each captured facial image may then be analyzed by comparing each facial image to a plurality of predefined facial expressions. Each facial image may then be matched to at least one predefined facial expression. Each facial image can then be assigned a value that represents the matched predefined facial expression. Next, a level of attentiveness of the interactive online event may be determined by processing each of the assigned values together. The level of attentiveness may then be provided to a host device accessing the interactive online event.

In another embodiment, a method for monitoring a participant's level of attentiveness within an online event is provided. In the exemplary embodiment, a video from a participant accessing an interactive online event is received. A facial image from the received video is captured. The captured facial image may then be analyzed by comparing the facial image to a plurality of predetermined facial expressions and matching the facial image to at least one predetermined facial expression. The facial image may then be assigned a value that represents the matched facial expressions. Next, a level of attentiveness of the interactive online event is determined by processing the assigned values together. The level of attentiveness is then provided to a host device accessing the interactive online event.

In another embodiment, a system for monitoring participants' level of attentiveness within an interactive online event is provided. The system, in this embodiment, may include a plurality of user devices accessing an interactive online event. Each user device may correspond to a participant accessing the interactive online event. The system may also include a host device accessing the interactive online event. The host device may correspond to a host of the interactive online event. The system may also include a server. The server may be operable to receive a plurality of videos from the user devices. The server may also be operable to capture at least one facial image from each received video. The server may be further operable to analyze the captured facial images. Each captured facial image may then be analyzed by comparing each facial image to a plurality of predefined facial expressions. Each facial image may then be matched to at least one predefined facial expression. Each facial image can then be assigned a value that represents the matched facial expression. The server may be further operable to determine a level of attentiveness for the interactive online event by processing each assigned value. The server may be further operable to transmit the determined level of attentiveness to the host device.

BRIEF DESCRIPTION OF THE DRAWINGS

It is noted that the U.S. patent or application file contains at least one drawing executed in color. Copies of this patent or patent application publication with color drawings will be provided by the U.S. Patent Office upon request and payment of the necessary fee. The above and other features of the present invention, its nature and various advantages will be more apparent upon consideration of the following detailed description, taken in conjunction with the accompanying drawings in which.

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

It should be noted that, as used herein, the terms "participant attentiveness" or "student attentiveness" are not to be construed as limited, and may correspond to any characterization or method for accessing an individual's interest in, ability to view, and/or capability to retain information being presented to them. Therefore, it should also be noted that, as used herein, the terms "class", "classroom", and/or "event" are not limited to be related to an educational process. For example, such applicable situations where an individual's attentiveness is analyzed may correspond to educational purposes, business purposes, legal purposes, entertainment purposes, marketing purposes, scientific purposes, or any other type of situation, or any combination thereof.

Figure 1:
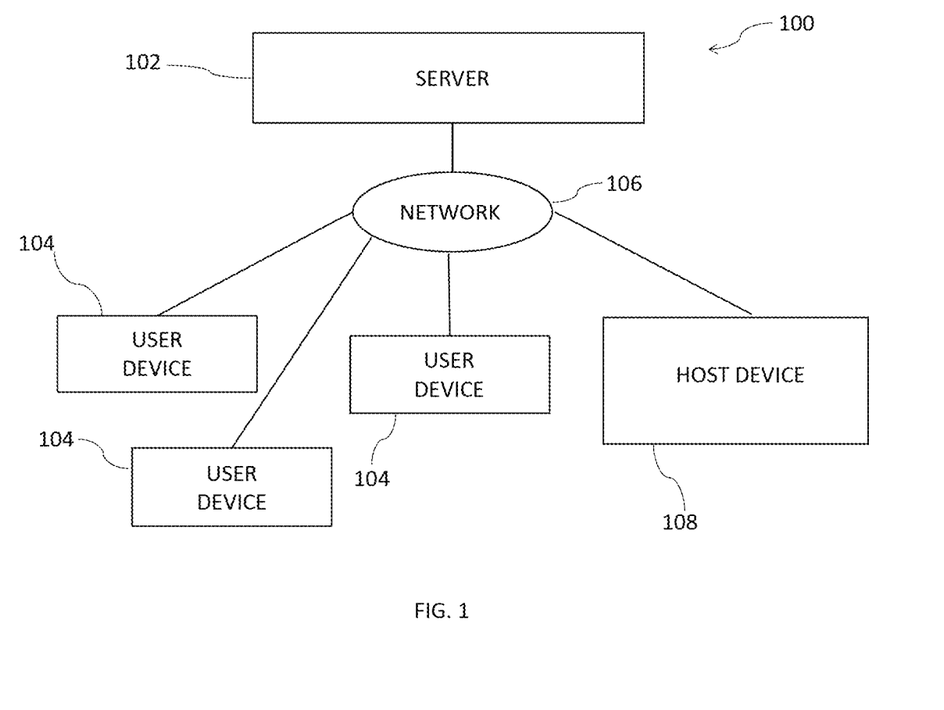
FIG. 1 is an illustrative diagram of a system in accordance with various embodiments.

FIG. 1 is an illustrative diagram of a system in accordance with various embodiments. System 100 may include server 102, user devices 104, and host device 108, which may communicate with one another across network 106. Although only three user devices 104, one host device 108, and one server 102 are shown within FIG. 1, persons of ordinary skill in the art will recognize that any number of user devices, host devices, and/or servers may be used. Furthermore, in some embodiments, one or more of user devices 104, host device 108, and server 102 may not be included. For example, system 100 may include user devices 104 and server 102, and no host device 108 may be present.

Server 102 may correspond to one or more servers capable of facilitating communications and/or servicing requests from user devices 104 and/or host device 108. User device 104 may send and/or receive data from server 102 and/or host device 104 via network 108. Similarly, host device 108 may send and/or receive data from server 102 and/or user devices 104 via network 106. In some embodiments, network 106 may facilitate communications between one or more user devices 104.

Network 106 may correspond to any network, combination of networks, or network devices that may carry data communications. For example, network 106 may be any one or combination of local area networks ("LAN"), wide area networks ("WAN"), telephone networks, wireless networks, point-to-point networks, star networks, token ring networks, hub networks, ad-hoc multi-hop networks, or any other type of network, or any combination thereof. Network 106 may support any number of protocols such as WiFi (e.g., 802.11 protocol), Bluetooth®, radio frequency systems (e.g., 900 MHZ, 1.4 GHZ, and 5.6 GHZ communication systems), cellular networks (e.g., GSM, AMPS, GPRS, CDMA, EV-DO, EDGE, 3GSM, DECT, IS-136/TDMA, iDen, LTE, or any other suitable cellular network protocol), infrared, TCP/IP (e.g., any of the protocols used in each of the TCP/IP layers), HTTP, BitTorrent, FTP, RTP, RTSP, SSH, Voice over IP ("VOIP"), or any other communication protocol, or any combination thereof. In some embodiments, network 106 may provide wired communications paths for user devices 104 and/or host device 108.

User device 104 may correspond to any electronic device or system capable of communicating over network 106 with server 102, host device 108, and/or with one or more additional user devices 104. For example, user devices 104 may be a portable media players, cellular telephones, pocket-sized personal computers, personal digital assistants ("PDAs"), desktop computers, laptop computers, wearable electronic devices, accessory devices, and/or tablet computers. User devices 104 may include one or more processors, storage, memory, communications circuitry, input/output interfaces, as well as any other suitable component, such a facial recognition module. Furthermore, one or more components of user devices 104 may be combined or omitted.

Host device 108 may correspond to any electronic device or system capable of communicating over network 106 with server 102 or user device 104. For example, host device 108 may a portable media players, cellular telephones, pocket-sized personal computers, personal digital assistants ("PDAs"), desktop computers, laptop computers, and/or tablet computers. Host device 108 may include one or more processors, storage, memory, communications circuitry, input/output interfaces, as well as any other suitable component, such a facial recognition module. Furthermore, one or more components of host device 108 may be combined or omitted.

Although examples of embodiments may be described for a user-server model with a server servicing requests of one or more user applications, persons of ordinary skill in the art will recognize that any other model (e.g., peer-to-peer) may be available for implementation of the described embodiments. For example, a user application executed on user device 104 may handle requests independently and/or in conjunction with server 102.

Figure 2:
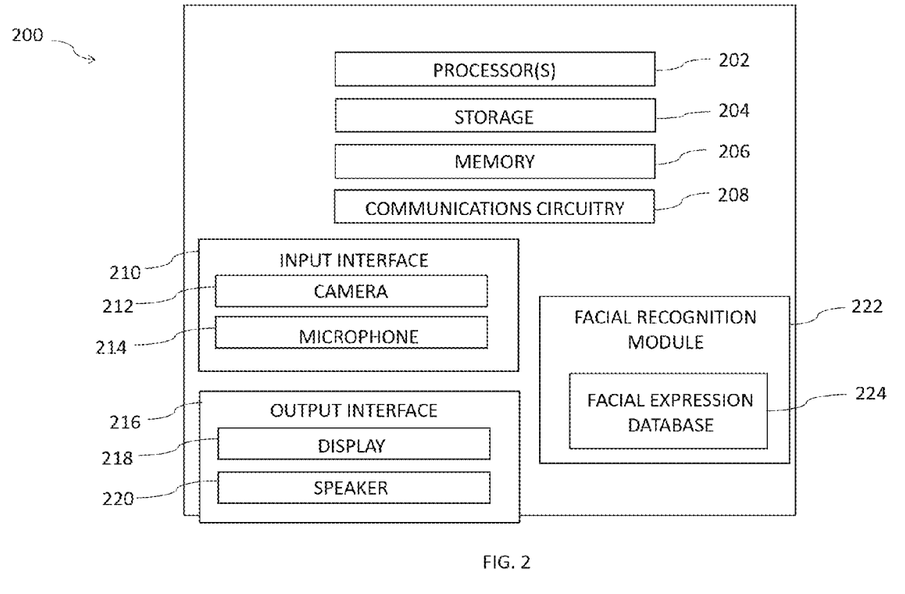
FIG. 2 is an illustrative block diagram of an exemplary device in accordance with various embodiments.

FIG. 2 is an illustrative block diagram of an exemplary device in accordance with various embodiments. Device 200 may, in some embodiments, correspond to one of user devices 104 and/or host device 108 of FIG. 1. It should be understood by persons of ordinary skill in the art, however, that device 200 is merely one example of a device that may be implemented within a server-device system, and it is not limited to being only one part of the system. Furthermore, one or more components included within device 200 may be added or omitted.

In some embodiments, device 200 may include processor 202, storage 204, memory 206, communications circuitry 208, input interface 210, output interface 216, and facial recognition module 222. Input interface 210 may, in some embodiments, include camera 212 and microphone 214. Output interface 216 may, in some embodiments, include display 218 and speaker 220. In some embodiments, one or more of the previously mentioned components may be combined or omitted, and/or one or more components may be added. For example, memory 204 and storage 206 may be combined into a single element for storing data. As another example, device 200 may additionally include a power supply, a bus connector, or any other additional component. In some embodiments, device 200 may include multiple instances of one or more of the components included therein. However, for the sake of simplicity, only one of each component has been shown within FIG. 2.

Processor 202 may include any processing circuitry, such as one or more processors capable of controlling the operations and functionality of device 200. In some embodiments, processor 202 may facilitate communications between various components within device 200. Processor 202 may run the device's operating system, applications resident on the device, firmware applications, media applications, and/or any other type of application, or any combination thereof. In some embodiments, processor 202 may process one or more inputs detected by device 200 and perform one or more actions in response to the detected inputs.

Storage 204 may correspond to one or more storage mediums. Various types of storage mediums may include, but are not limited to, hard-drives, solid state drives, flash memory, permanent memory (e.g., ROM), or any other storage type, or any combination thereof. Any form of data or content may be stored within storage 204, such as photographs, music files, videos, contact information, applications, documents, or any other file, or any combination thereof. Memory 206 may include cache memory, semi-permanent memory (e.g., RAM), or any other memory type, or any combination thereof. In some embodiments, memory 206 may be used in place of and/or in addition to external storage for storing data on device 200.

Communications circuitry 208 may include any circuitry capable of connecting to a communications network (e.g., network 106) and/or transmitting communications (voice or data) to one or more devices (e.g., user devices 104 and/or host device 108) and/or servers (e.g., server 102). Communications circuitry 208 may interface with the communications network using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof.

Input interface 210 may include any suitable mechanism or component for receiving inputs from a user operating device 200. Input interface 210 may also include, but is not limited to, an external keyboard, mouse, joystick, musical interface (e.g., musical keyboard), or any other suitable input mechanism, or any combination thereof.

In some embodiments, user interface 210 may include camera 212. Camera 212 may correspond to any image capturing component capable of capturing images and/or videos. For example, camera 212 may capture photographs, sequences of photographs, rapid shots, videos, or any other type of image, or any combination thereof. In some embodiments, device 200 may include one or more instances of camera 212. For example, device 200 may include a front-facing camera and a rear-facing camera. Although only one camera is shown in FIG. 2 to be within device 200, it persons of ordinary skill in the art will recognize that any number of cameras, and any camera type may be included. Additionally, persons of ordinary skill in the art will recognize that any device that can capture images and/or video may be used. Furthermore, in some embodiments, camera 212 may be located external to device 200.

In some embodiments, device 200 may include microphone 214. Microphone 214 may be any component capable of detecting audio signals. For example, microphone 214 may include one more sensors or transducers for generating electrical signals and circuitry capable of processing the generated electrical signals. In some embodiments, user device may include one or more instances of microphone 214 such as a first microphone and a second microphone. In some embodiments, device 200 may include multiple microphones capable of detecting various frequency levels (e.g., high-frequency microphone, low-frequency microphone, etc.). In some embodiments, device 200 may include one or external microphones connected thereto and used in conjunction with, or instead of, microphone 214.

Output interface 216 may include any suitable mechanism or component for generating outputs from a user operating device 200. In some embodiments, output interface 216 may include display 218. Display 218 may correspond to any type of display capable of presenting content to a user and/or on a device. Display 218 may be any size and may be located on one or more regions/sides of device 200. For example, display 218 may fully occupy a first side of device 200, or may occupy a portion of the first side. Various display types may include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In some embodiments, display 218 may be a touch screen and/or an interactive display. In some embodiments, the touch screen may include a multi-touch panel coupled to processor 202. In some embodiments, display 218 may be a touch screen and may include capacitive sensing panels. In some embodiments, display 218 may also correspond to a component of input interface 210, as it may recognize touch inputs.

In some embodiments, output interface 216 may include speaker 220. Speaker 220 may correspond to any suitable mechanism for outputting audio signals. For example, speaker 220 may include one or more speaker units, transducers, or array of speakers and/or transducers capable of broadcasting audio signals and audio content to a room where device 200 may be located. In some embodiments, speaker 220 may correspond to headphones or ear buds capable of broadcasting audio directly to a user.

Device 200 may, in some embodiments, also include facial recognition module 222. Facial recognition module 222 may allow device 200 to analyze a user or users facial expression(s), and determine a type of mood or level of attentiveness associated with the user or users based on the analysis. Facial recognition module 222 may receive an image from captured from camera 212 or display 218 (e.g., video chat windows within a user interface presented on display 218), and determine a facial expression for the user or users depending on various facial characteristics determined therefrom.

For example, facial recognition module 222 may be able to determine that the image or images include a user who is smiling, nodding, furrowing their brow, crying, or displaying any other type of emotion. The various facial expressions determined to be present within the image or images may then be stored in facial expression database 224, for example. Facial expression database 224 may also, in some embodiments, be used to compare captured images with pre-defined facial expressions to determine what a particular user or users facial expression is. For example, a received image of a user may be compared against pre-defined images of a user smiling, nodding, furrowing their brow, crying, etc., to determine whether the user within the received image is expressing any one of these emotions. In some embodiments, facial expression database 224 may also learn or receive new expressions, or update how a particular expression is characterized based on the received images.

In some embodiments, facial recognition module 222 may also include analysis software executable on device 200 that allows a user to take the determined facial expressions and generate data signifying an emotion or level of attentive of the individuals within the images. For example, a teacher viewing video chat windows corresponding to students within an online classroom may be able to determine, based on the facial expressions of each student seen and captured within each students' video chat window, a level of attentiveness for the students. In this way, a teacher may be better able to gauge whether the students are understanding the material being presented in real-time, and appropriately modify or augment their presentation to enhance the learning experience.

Figure 3:
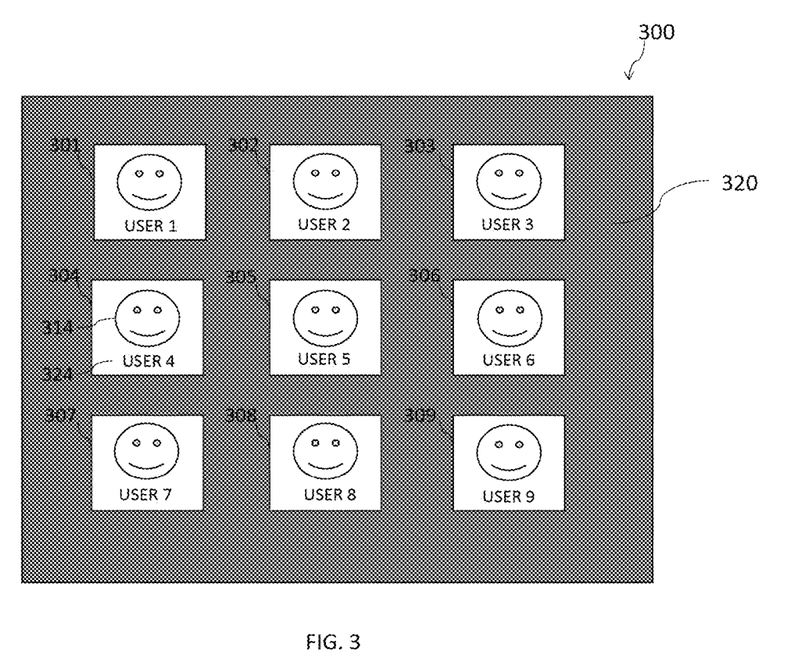
FIG. 3 is an illustrative diagram of an exemplary user interface presenting a plurality of participants from an online event in accordance with various embodiments.

FIG. 3 is an illustrative diagram of an exemplary user interface in accordance with various embodiments. User interface 300 may, in some embodiments, correspond to a user interface displayed on host device 108. For example, host device 108 may be a device operated by a teacher of an online classroom, and video chat windows 301-309 may correspond to video chat windows for students participating in the online class. Although only nine video chat windows are displayed within user interface 300, any number of video chat windows may be included (e.g., 50, 100, 1,000, etc.).

Each video chat window 301-309 may include an image of that particular user's face and/or body, as well as a user identifier for the corresponding user. For example, video chat window 304 includes facial image 314, corresponding to user identifier 324—"USER 4". In some embodiments, the device displaying user interface 300 (e.g., host device 108), may analyze each facial image 314 corresponding to each video chat window displayed therein to determine a facial expression of that video chat window's corresponding user. However, in some embodiments, the device displaying user interface 300 and/or the server may analyze each user accessing an online event, such as the online class previously mentioned, to determine each user's facial expression. If the number of participants in the online event is very large, it may be difficult to view them all at a same time on one user interface, therefore, each video feed from each user accessing the online event may be analyzed in some embodiments, regardless of whether or not the corresponding video feed is displayed within a video chat window in user interface 300. However, for simplicity, the facial expressions of users corresponding to displayed video chat windows will be described.

As shown in user interface 300, each facial image of each video chat window 301-309 corresponds to a facial expression that may be characterized as smiling or happy, for example. This information may be determined using facial recognition module 222 of FIG. 2, and may then be converted to numerical data or some other form of indicator (e.g., visual, audio), such as one of a variety of colors, for the host or presenter of the online event. For example, if all of the users accessing the online event corresponding to user interface 300 are smiling, facial recognition module 222 will display data to the presenter signifying that a large percentage (e.g., 90% or greater) are favorably receiving the information being presented to them. For example, all of video chat windows 301-309 may be shaded green to indicate to the instructor that the corresponding users appear to be engaged. In some embodiments, user interface 300 may have its background 320 change to a color indicating that the majority of students are engaged in the materials being presented. For example, when background 320 is green, the instructor will know that the corresponding participants are engaged.

In some embodiments, video chat windows 301-309 may display more than just a corresponding user's face. For example, a user's face and body may also be displayed within their video chat window. In some embodiments, the user's face and body may be analyzed to determine a user's emotion. For example, a user who is slouching may correspond to a user who is not paying attention, whereas a user sitting upright may correspond to a user fully engaged in the presentation.

Figure 4:
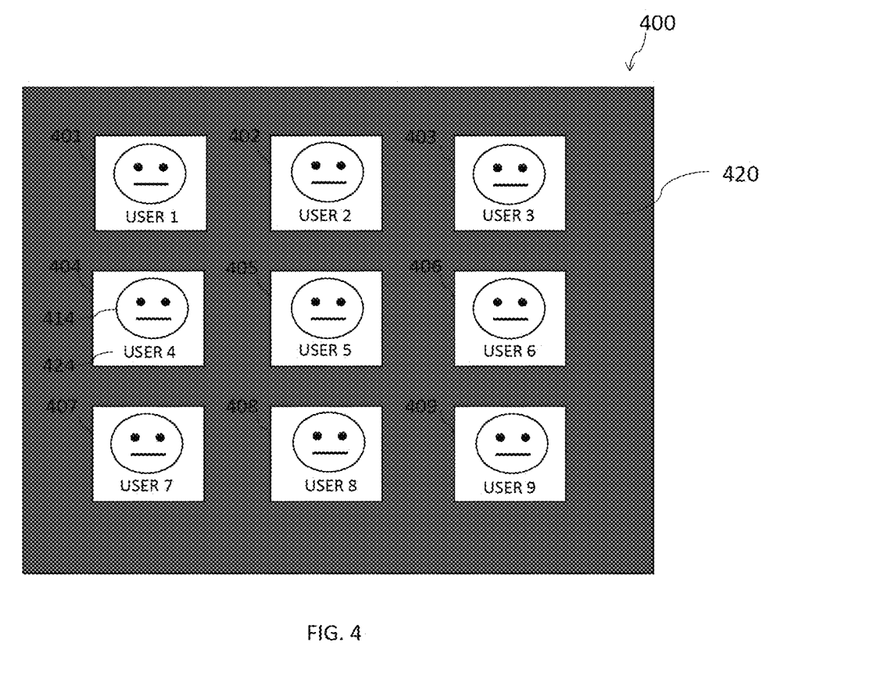
FIG. 4 is an illustrative diagram of an exemplary user interface presenting a plurality of participants from an online event in accordance with various embodiments.

FIG. 4 is an illustrative diagram of an exemplary user interface in accordance with various embodiments. User interface 400 may, in some embodiments, be substantially similar to user interface 300 of FIG. 3, with the exception that the facial expressions of facial images 414 of users displayed within video chat windows 401-409 may be different than the facial expression of the users within video chat windows 301309 of FIG. 3. For example, facial images 414 may correspond to a user, such as "USER 4" 424, frowning or not smiling. In this case, the individual chat windows or background 420 may turn yellow or red, for example, depending on the level of dissatisfaction or lack of engagement that facial recognition module 222 determines the faces of the users displayed within video chat windows 401-409 are presenting. For example, background 420 may be red, signifying that the majority of participants are not engaged. In some embodiments, additional visual or audio cues may be provided to the presenter on their host device, where the cues indicate to the presenter that the users whose images are being displayed within video chat videos 401-409 are not comprehending the presentation. For example, user interface 400 may flash, beep, blink, or provide any other audio/visual indicator, or any combination thereof.

Similarly, facial images received from each of video chat windows 401-409 may correspond to similar emotional reading of the corresponding users. Facial recognition module 222 may therefore determine that the users accessing the online event who displayed by user interface 400 are not understanding or paying attention to the presented materials, and therefore data may be sent to the presenter informing them that a low number of students (e.g., less than 20%) are understanding the material being discussed. This may allow the presenter to accurately modify their presentation so that their content is more favorably received.

Figure 5:
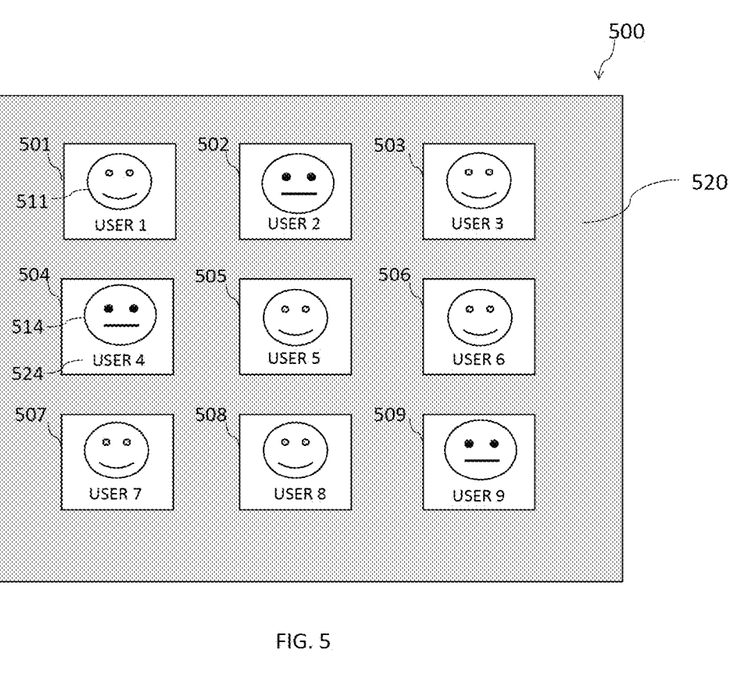
FIG. 5 is an illustrative diagram of an exemplary user interface presenting a plurality of participants from an online event in accordance with various embodiments.

FIG. 5 is an illustrative diagram of an exemplary user interface in accordance with various embodiments. User interface 500, in some embodiments, may be substantially similar to user interfaces 300 and 400 of FIGS. 3 and 4, respectively, with the exception that some facial images of some users may correspond to users having one emotion, while other users may have a different emotion. For example, user interface 500 may include video chat windows 501-509, each including facial images, such as facial images 511 and 514, and user identifiers, such as "USER 4" 524.

In some embodiments, facial image 511 of video chat window 501 may be substantially similar to facial image 314 of FIG. 3. Furthermore, video chat windows 503 and 505-508 may also have facial images similar to facial image 511. This may correspond to each user of the corresponding video chat windows having a similar facial expression, which in some embodiments may be smiling. In some embodiments, facial image 514 of video chat window 501 may be substantially similar to facial image 414 of FIG. 4. Furthermore, video chat windows 502 and 509 may also have facial images displayed therein that are similar to facial image 514. This may correspond to each user of the corresponding video chat windows having a similar facial expression, which in some embodiments may correspond to frowning.

The information corresponding to the various facial expressions of each user of video chat windows 501-509 may be analyzed within facial recognition module 222 of device 200, and converted into data for a presenter or host to use. For example, based on the facial expressions received within video chat windows 501-509 of user interface 500, a host or presenter may be informed that approximately 33% (e.g., one-third) of the participants are disinterested or not paying attention. The host or presenter may then be able to modify the presented materials to better allow the entire participation group to comprehend the material. In this case, background 520 may, accordingly, turn yellow or some other color, signifying that some participants are paying attention while others are not. In some embodiments, the color of a partially engaged class may vary in hue based on the amount of participants that are engaged in the online event.

Figure 6:
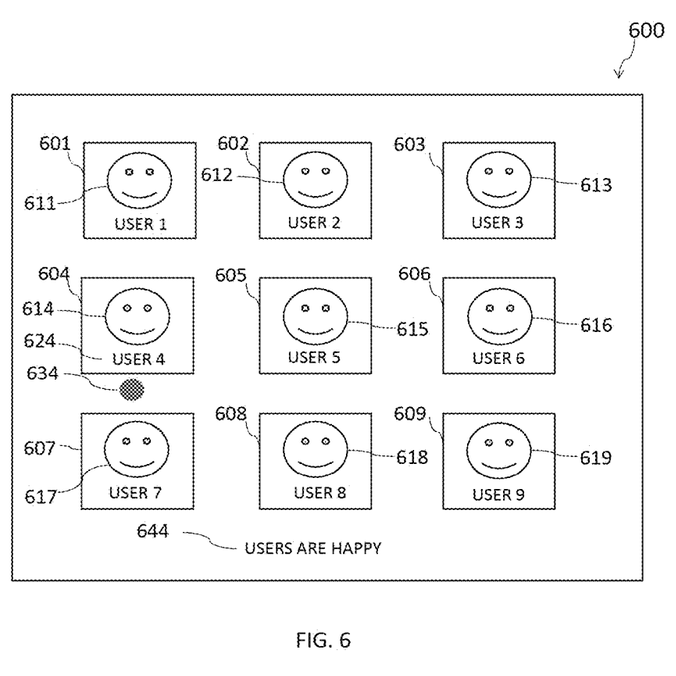
FIG. 6 is an illustrative diagram of an exemplary user interface presenting a plurality of participants from an online event in accordance with various embodiments.

FIG. 6 is an illustrative diagram of an exemplary user interface in accordance with various embodiments. User interface 600 may, in some embodiments, correspond to a user interface displayed on host device 108. For example, host device 108 may be a device operated by a teacher of an online classroom, and video chat windows 601-609 may correspond to video chat windows for students participating in the online class. Although only nine video chat windows are displayed within user interface 600, any number of video chat windows may be included (e.g., 50; 100; 1,000; etc.).

Each of video chat windows 601-609 may include an image of that particular user's face and/or body (or a portion of that user's face and/or body), and a user identifier. For example, video chat window 604 includes facial image 614, corresponding to user identifier 624—"USER 4". Each video chat window (e.g., chat windows 601-609) also includes a facial image (e.g., facial images 611-619) of the corresponding user, which may be captured (e.g., by camera 212) In some embodiments, the device displaying user interface 600 (e.g., host device 108), may analyze each facial image (e.g. facial images 611-619) corresponding to each video chat window (e.g., chat windows 601-609) displayed thereon to determine a facial expression of that video chat window's corresponding user. However, in some embodiments, the device displaying user interface 600 and/or the server may analyze a facial image of each user accessing an online event, such as the online class previously mentioned, to determine each user's facial expression. If the number of participants in the online event is very large, it may be difficult or even not feasible to view them all of the participants at a same time on a single user interface. Therefore, in some embodiments, a video feed from each accessing user may be analyzed regardless of whether or not the corresponding video feed is displayed within a video chat window in user interface 600. However, for simplicity, only the facial expressions of users corresponding to video chat windows 601-609, which are displayed within user interface 600, will be described.

As shown in user interface 600, each facial image of each video chat window 601-609 includes a facial expression that may be characterized as smiling, or happy. This information may be determined using facial recognition module 222 of FIG. 2, and may be converted to numerical data or some other form of indicator (e.g., visual, audio), such as one of a variety of colors, for the host or presenter of the online event. For example, because USER 4 in chat window 604 is smiling, indicator 634 may change to be green. Indicator 634 can change colors as the facial expression in chat window 604 changes. For example, if USER 4 in chat window 604 starts frowning, indicator 634 may turn red. Although only one indicator is shown, indicators for each video chat window (e.g. video chat windows 601-609) may be provided. Although indicator 634, in the illustrative embodiment, is a circle, persons having ordinary skill in the art will recognize that any type of indicator may be used, including but not limited to words, symbols, and letters.

Furthermore, in some embodiments, a message 644 may be displayed within user interface 600. Message 644 may indicate an overall status, or emotion, of the individuals accessing the interactive event displayed using user interface 600. For instance, because video chat windows 601-609 show participants that are happy, message 644 may state: "USERS ARE HAPPY," or "ATTENTIVENESS OF USERS IS GOOD." Message 644 may change as the facial expressions of one or more of the participants change. Furthermore, in some embodiments, the message may relate to any number of participants (e.g. "USER 4 IS HAPPY").

In some embodiments, indicator 634 and message 644 may only be visible if the host chooses. The interactive online event may give access to the indicators, allowing a host to view them if he or she wishes. Furthermore, indicator 634 and message 644 may be sent or simply stored for the host to review at a later time.

Figure 7:
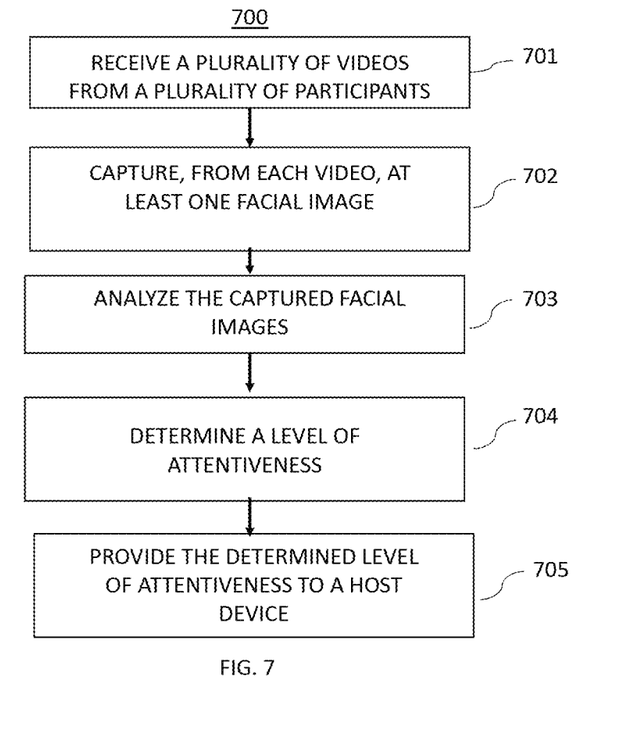
FIG. 7 is an illustrative flowchart of an exemplary process in accordance with various embodiments.

FIG. 7 is an illustrative flowchart of an exemplary process in accordance with various embodiments. Process 700 may begin at step 701. At step 701, videos may be received from a plurality of participants accessing an interactive online event. For example, as seen in FIG. 6, videos from nine participants are received by a host device (e.g., host device 108), and may be displayed within a user interface (e.g., user interface 600).

Process 700 may continue at step 702. At step 702, one or more facial images of a participant may be captured from each video chat window. For example, a facial image may be captured for each of video chat windows 601-609 (e.g. facial image 614). In some embodiments, each of video chat windows 601-609 may correspond to a student accessing an online classroom, which may be displayed on a teacher or host's device (e.g., host device 108). For example, user interface 600 may be displayed on a display screen of a teacher user device.

Process 700 may continue at step 703. After the facial images are captured, at step 703, each facial image may be analyzed. Facial recognition module 222, for example, may analyze each facial image, such as facial images 611-619, of each video chat window (e.g., video chat windows 601-609), and may determine a facial expression for each corresponding user. In some embodiments, facial recognition module 222 may analyze each facial image individually to look for specific characteristics of a user's face that correspond to specific emotions. In another embodiment, facial recognition module 222 may compare each facial image against a pre-defined facial image associated with a certain emotion.

In one embodiment, the analysis of the facial images may begin with a comparison being performed of each facial image against a plurality of predefined facial expressions stored in memory. Predefined facial expressions may correspond to images of such emotions as: happy, confused, focused, bored, attentive, and/or understood. These predefined facial expressions may be stored in a database, such as facial expression database 224 of device 200. In some embodiments, each stored facial expression has an associated value. For example, the following values may be associated with some predefined facial expressions stored within facial expression database 224: Happy—10; Confused—3; Focused—15; Bored—1; Attentive—12; and Understood—20.

Continuing the example, the analysis of the facial images may continue by matching each facial image to a predefined facial expression. To compare and match facial images to predefined facial expressions, facial recognition module 222 may look for patterns and/or sequences in numerical data representing each captured facial image. In a captured facial image, each part of the image includes pixels. A pixel is a minute area of illumination on a display screen. The system interprets each image's pixels as a series of numbers. To identify each image, the system may identify images by matching it with images having a similar numerical series. If an image has a similar numerical series as another image above a certain predefined threshold level, then there a match between the two images is determined to be present. A match between two images may correspond to more than 75% of the numerical series being equivalent, however persons of ordinary skill in the art will recognize that this value is exemplary, and any suitable threshold value may be employed. So, facial recognition module 222 may interpret a facial image's as displaying an emotion or feeling based on an emotion or feeling associated with the matched predefined facial expression. The captured facial image's pixels may, therefore, be compared to the pixels of various predefined facial expressions.

If a match is determined to be present, a value associated with that predefined facial expression is assigned to the facial image matched thereto. Facial recognition module 222 may continue to compare the facial image to predefined facial expressions to see if there are additional matches. For example, a captured facial image from chat window 604 may indicate that the corresponding user is displaying a happy expression and, therefore, the captured image may be assigned a value of 10 to reflect that the user is happy. Persons having ordinary skill in the art recognize that the above method of comparing and matching images is merely exemplary.

Process 700 may continue at step 704. At step 704, the corresponding values assigned to each facial image are processed to determine a level of attentiveness for the participants of the interactive online event. The values may be processed in any number of ways. For example, the values may be added together to determine the level of attentiveness for the interactive online event. Continuing the example where the predefined facial expression corresponding to the emotion "happy" is assigned a value of 10 (e.g., facial images 611-619 show users that are happy), the assigned values for each captured facial image would be 10. Processing the assigned values would be accomplished by adding each value (e.g., 10), together. Therefore, the sum of the assigned values in this example is 90. In some embodiments, the total value for the level of attentiveness may be used to gauge the overall emotion of the participants of the event. For example, if the combined value is greater than a certain level, a certain emotion may be attributed to the participants. As an illustrative example, a sum greater than 60 may correspond to participants being "happy." Using the example above, the sum of the assigned values is 90, and therefore the determined level of attentiveness for the interactive online event would be determined to be happy, as the sum is greater than the level for defining the emotional state of the group as happy (e.g., 60). While only a sum of the assigned values is shown, persons having ordinary skill in the art would understand that any number of algorithms or methods can be used to process the assigned values. The processing may be completed through the use of processor(s) 202 and facial recognition module 222 of device 200.

In one embodiment, a facial image that was captured may be matched to more than one predefined facial expression. For example, a user may be both happy and focused. In this example, there may be a blended value assigned. If a blended value is used, the blended value may be an average between both assigned values. Continuing the example, because a predefined facial expression corresponding to the emotion "happy" has a value of 10, and the predefined facial expression corresponding to the emotion "focused" has a value of 15, the blended value would be 12.5. Alternatively, the facial image may be counted twice: once as the first matched facial expression, and another time as the second matched facial expression. Using the previous example, the total value would be 25, corresponding to adding the values for happy (e.g., 10) and focused (e.g., 15). Persons of ordinary skill recognize that any suitable combinatory technique may be employed, and the aforementioned are merely exemplary.

Process 700 may continue at step 705. At step 705, attentiveness data corresponding to the level of attentiveness for the participants of the interactive online event is provided to a host device. Once the assigned values are processed and the level of attentiveness is determined, this data may be provided to a host device. The attentiveness data may allow the presenter to refine or modify their presentation so a larger amount of students receive the material being presented, and thus enhancing the overall experience of each participant. For example, if the interactive online event is an online class the host is a teacher, and the participants are students, if the level of attentiveness shows the students are confused, the teacher may change how he or she is teaching.

In some embodiments, in addition to attentiveness data corresponding to the level of attentiveness of the participants of the interactive online event, the host may also receive data indicating which predefined facial expression has been associated with each particular participant accessing the interactive online event. In some embodiments, the associated predefined facial expression may be displayed within the host's displayed user interface to show the video chat window for each user with the determined corresponding predefined facial expression. In some embodiments, this data may be also stored for later use by a host. For example, if only one student is not understanding the material, the host may continue the interactive online event to accommodate the majority of students. Once the interactive online event is over, the host may look at the data and revisit the material with the participant that did not understand the material.

Process 700 may be used in situations where the online event is prerecorded. In this case, each participant's level of attentiveness may be provided to the host during or after the participant has completed the online event.

In some embodiments, process 700 may be a dynamic process that updates the level of attentiveness and provides it to the host in real time. This may allow the host to continually receive feedback regarding the effectiveness of their presented materials, and modify their presentation techniques accordingly through the presentation's duration. Additionally, the attentiveness data may be stored so the host of the interactive online event can review how participants reacted throughout the online event. Furthermore, process 700 may be repeated a plurality of times throughout the presentation. In this scenario, captured facial images may be compared with one another to measure the displacement of certain facial characteristics. In this particular embodiment, a facial expression, and therefore a level of attentiveness, may be determined from the measured displacement of facial characteristics. As an illustrative example, at a first time, an individual's face image may display a smile. At a second time, the individual's face may display a slightly different configuration of that individual's mouth. The difference between the position of the mouth corresponding to the smile and the new configuration may be analyzed to determine a displacement of the individual's mouth. Certain emotional states may, therefore, be associated with different displacements for different features. In the aforementioned example, the determined displacement may indicate that the participant has gone from a happy state to a confused state.

Figure 8:
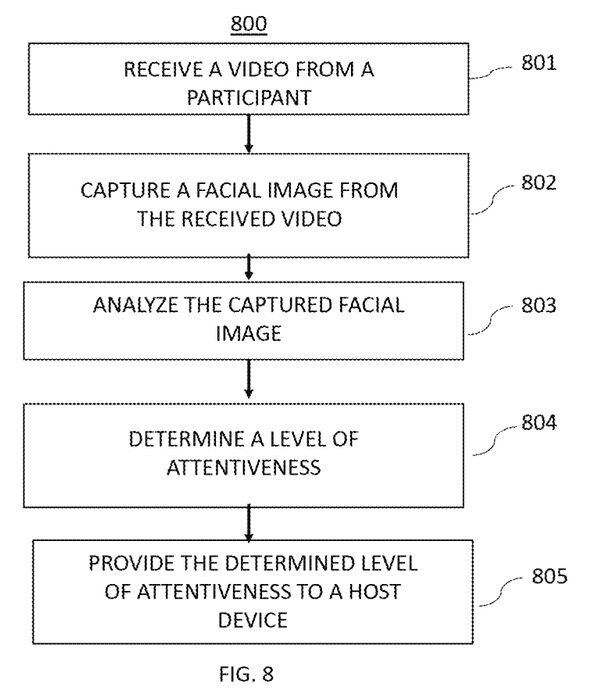
FIG. 8 is an illustrative flowchart of an exemplary process in accordance with various embodiments.

FIG. 8 is an illustrative flowchart of an exemplary process in accordance with various embodiments. Process 800 may begin at step 801. At step 801, a video may be received from a participant accessing an interactive online event. For example, the interactive online event may be an online class, the participant may be a student, and the host may be a teacher. In some embodiments, step 801 of process 800 may be substantially similar to step 701 of process 700, and the previous description may apply.

Process 800 may continue at step 802. At step 802, a facial image from the received video of a participant may be captured. For example, facial image 614 may be captured from video chat window 604. In some embodiments, a video chat window may correspond to a student accessing an online classroom, which may be displayed on a teacher or host's device. For example, user interface 600 may be displayed on a display screen of a teacher or host's device. Step 802 of process 800, in some embodiments, may be substantially similar to step 702 of process 700, and the previous description may also apply.

Process 800 may continue at step 803. After the facial image has been captured, at step 803 the facial image may be analyzed. A facial recognition module, such as facial recognition module 222 of device 200, may analyze the captured facial image (e.g., facial image 614 from video chat window 604). In some embodiments, facial recognition module 222 may analyze the captured facial image to look for specific characteristics of a user's face that correspond to specific emotions, or facial recognition module 222 may compare the facial image against a pre-defined facial image associated with a certain emotion (e.g., predefined facial expression).

In one embodiment, the analysis of the facial image starts with a comparison being performed for the facial image against a variety of predefined facial expressions stored in memory. Predefined facial expressions may correspond to images of such emotions as: happy, confused, focused, bored, attentive, and/or understood. These predefined facial expressions may be stored in a database, such as facial expression database 224 of device 200. In some embodiments, each stored facial expression has an associated value. For example, the following values may be associated with some particular facial expression having predefined facial expressions stored within facial expression database 224: Happy—10; Confused—3; Focused—15; Bored—1; Attentive—12; and Understood—20.

Continuing the example, the analysis of the facial image continues by determining at least one predefined facial expression the facial image. When a match is determined to occur between a facial expression and the facial image, the value associated with that matched facial expression is assigned to the facial image. For example, the facial expression corresponding to the emotion "Happy" may have a value—10, and therefore the captured image 614 would be assigned the value of 10 to reflect that the user is happy.

Process 800 may continue at step 804. At step 804, the corresponding value assigned to the facial image is processed to determine a level of attentiveness for the participant of the interactive online event. The value may be processed in any number of ways. For example, the values may be compared to the assigned values to each facial expression. Continuing the above example, because captured image 614 was assigned a value of 10, the level of attentiveness for the participant would be Happy. In some embodiments, step 804 of process 800 may be substantially similar to step 704 of process 700, and the previous description may apply.

Process 800 may continue at step 805. At step 805, the level of attentiveness for the participant of the interactive online event may be provided to a host device. Continuing the above example, the host would be provided with a determined level of attentiveness of "Happy." The attentiveness data may allow the presenter to refine or modify their presentation so a larger amount of students comprehend the material being presented, and thus enhancing the overall experience of each participant. For example, if the interactive online event is an online class, the host is a teacher, the participants are students, and the level of attentiveness indicates that the students are confused, the teacher may decide to change how he or she is teaching based on the attentiveness data. In some embodiments, step 805 of process 800 may be substantially similar to step 705 of process 700, and the previous description may apply.

In some embodiments, in addition to the level of attentiveness of the interactive online event, the host may also receive data showing each matched predefined facial expression. Furthermore, the data may also show the particular participant associated with that the matched facial expression.

Process 800 may be used in situations where the online event is prerecorded. In this case, the participant's level of attentiveness may be provided during or after the participant has completed the online event.

In some embodiments, process 800 may be a dynamic process that updates the level of attentiveness and provides it to the host in real time. This may allow the host to continually receive feedback regarding the effectiveness of their presented materials, and modify their presentation techniques accordingly through the presentation's duration. Additionally, the attentiveness data may be stored so the host of the interactive online event can review how participants reacted throughout the online event. Furthermore, process 800 may be repeated a plurality of times throughout the presentation. In this scenario, captured facial images may be compared with one another to measure the displacement of certain facial characteristics. In this particular embodiment, a facial expression, and therefore a level of attentiveness, may be determined from the measured displacement of facial characteristics. As an illustrative example, at a first time, an individual's face image may display a smile. At a second time, the individual's face may display a slightly different configuration of that individual's mouth. The difference between the position of the mouth corresponding to the smile and the new configuration may be analyzed to determine a displacement of the individual's mouth. Certain emotional states may, therefore, be associated with different displacements for different features. In the aforementioned example, the determined displacement may indicate that the participant has gone from a happy state to a confused state.

In some embodiments, providing assistance to individuals expressing confusion or other negative emotions may be enhanced. For example, enhanced analytics of which participants within the interactive online event are experiencing difficulty may be ascertained via the facial recognition module. This information may be used in real-time to help those students to better understand the material being presented. Furthermore, the information regarding attentiveness may be used asynchronously with the presentation of the material to allow a teacher or presenter to contact individuals who expressed confusion during the presentation, and reach out and help them.

In some embodiments, the facial recognition module may run during a live presentation or during a recorded teaching. For example, the facial expressions of students within an online class may be analyzed and quantified based on the presented materials. Therefore, in at least one embodiment, the presenter, such as a teacher, may present materials to the students live or from a pre-recorded video.

In some embodiments, the facial recognition module may continually run throughout the span of the presentation to determine a cycle of expressions or emotions displayed by an individual. For example, if a student is expressing confusion for a prolonged period of time, that data may be provided to the teacher so that the teacher may attempt to aid the student. This may be extremely helpful because some students may only suffer from confusion for a short period of time, while others may suffer from confusion for longer periods of time. The students suffering confusion for short periods of time may be able to quickly resolve their confusion, whereas students suffering confusion for longer periods of time may require additional help or guidance.

Furthermore, in some embodiments, educational institutions, such as universities or high schools, may use the analyzed data to determine teacher or presenter effectiveness. For example, if a teacher continually receives confused facial expressions, that teacher may not be performing adequately, and therefore the institution the teacher works for may assess the teacher's effectiveness accordingly. This may be extremely useful for institutions that want quantitative data corresponding to teacher effectiveness that are not measurable solely by using a teachers grading system or grading history, as a lenient teacher may garner high marks based on their grading history, but may generally be ineffective in teaching the required materials.

The various embodiments described herein may be implemented using a variety of means including, but not limited to, software, hardware, and/or a combination of software and hardware. The embodiments may also be embodied as computer readable code on a computer readable medium. The computer readable medium may be any data storage device that is capable of storing data that can be read by a computer system. Various types of computer readable media include, but are not limited to, read-only memory, random-access memory, CD-ROMs, DVDs, magnetic tape, or optical data storage devices, or any other type of medium, or any combination thereof. The computer readable medium may be distributed over network-coupled computer systems. Furthermore, the above described embodiments are presented for the purposes of illustration are not to be construed as limitations.

What is claimed is:

1. A method for monitoring participants' level of attentiveness within an interactive online event, the method comprising:
receiving, from each of a plurality of participants accessing an interactive online event, at least one video;
capturing, from each received video, at least one facial image;
analyzing each captured facial image, wherein analyzing comprises:
comparing each captured facial image to a plurality of predefined facial expressions; and
matching each captured facial image to at least one predefined facial expression, wherein each match assigns a value to the captured facial image;
determining a level of attentiveness for the interactive online event by processing each of the assigned values together; and
providing attentiveness data representing the determined level of attentiveness to a host device accessing the interactive online event.

2. The method of claim 1, further comprising:
providing, to the host device, access to each matched facial expression.

3. The method of claim 1, further comprising:
generating a plurality of indicators, each indicator representing the value assigned to each captured image; and
providing, to the host device, access to the generated plurality of indicators.

4. The method of claim 1, further comprising:
changing a color of a user interface displayed on the host device in response to the attentiveness data.

5. The method of claim 1, further comprising:
providing a message representing the attentiveness data to the host device.

6. The method of claim 5, wherein the message comprises at least one of: happy, confused, focused, bored, attentive, and understood.

7. The method of claim 1, wherein:
the interactive online event is an online class;
the plurality of participants are students accessing the online class; and
the host device is a terminal accessible to a teacher of the online class.

8. The method of claim 1, wherein the plurality of predefined facial expressions comprises an emotion of at least one of: happy, confused, focused, bored, attentive, and understood.

9. A method for monitoring a participant's level of attentiveness within an interactive online event, the method comprising:
A) receiving video from a participant accessing an interactive online event;
B) capturing a facial image from the received video;
C) analyzing the captured facial image, wherein analyzing comprises:
comparing the captured facial image to a plurality of predefined facial expressions; and
matching the captured facial image to at least one predefined facial expression wherein each match assigns a value to the captured facial image;
D) determining a level of attentiveness of the interactive online event by processing each assigned value; and
E) providing the determined level of attentiveness to a host device accessing the interactive online event.

10. The method of claim 9, wherein steps B through E are repeated a plurality of times during the interactive online event.

11. The method of claim 9, further comprising:
providing, to the host device, access to each matched type of facial expression.

12. The method of claim 9, further comprising:
generating an indicator, the indicator representing the value assigned to the captured image; and
providing, to the host device, access to the generated indicator.

13. The method of claim 9, further comprising:
changing the color of a user interface of the host device in response to the level of attentiveness.

14. The method of claim 9, wherein the data further comprises a message stating the level of attentiveness.

15. The method of claim 14, wherein the message comprises at least one of: happy, confused, focused, bored, attentive, and understood.

16. The method of claim 9, wherein:
the interactive online event is an online class;
the participant is a student accessing the online class; and
the host device is a terminal accessible to a teacher of the online class.

17. The method of claim 9, wherein the plurality of types of facial expressions comprises at least one of: happy, confused, focused, bored, attentive, and understood.

18. A system for monitoring participants' level of attentiveness within an interactive online event, the system comprising:
a plurality of user devices accessing an interactive online event, wherein each user device corresponds to a participant of the interactive online event;
a host device accessing the interactive online event, wherein the host device corresponds to a host of the interactive online event;
a server, the server operable to:
receive, from each of the plurality of user devices, at least one video;
capture, from each received video, at least one facial image;
analyze each captured facial image, wherein analyze comprises:
compare each captured facial image to a plurality of predefined facial expressions; and
match each captured facial image to at least one predefined facial expression, wherein each match assigns a value to the captured facial image;
determine a level of attentiveness for the interactive online event by processing each of the assigned values together; and
transmit the determined level of attentiveness to the host device.

19. The system of claim 18, the server further operable to:
change the color of a user interface of the host device in response to the level of attentiveness.

20. The method of claim 18, wherein:
the interactive online event is an online class;
the plurality of participants are students accessing the online class; and
the host is a teacher of the online class.

* * * * *